UNITED STATES PATENT OFFICE.

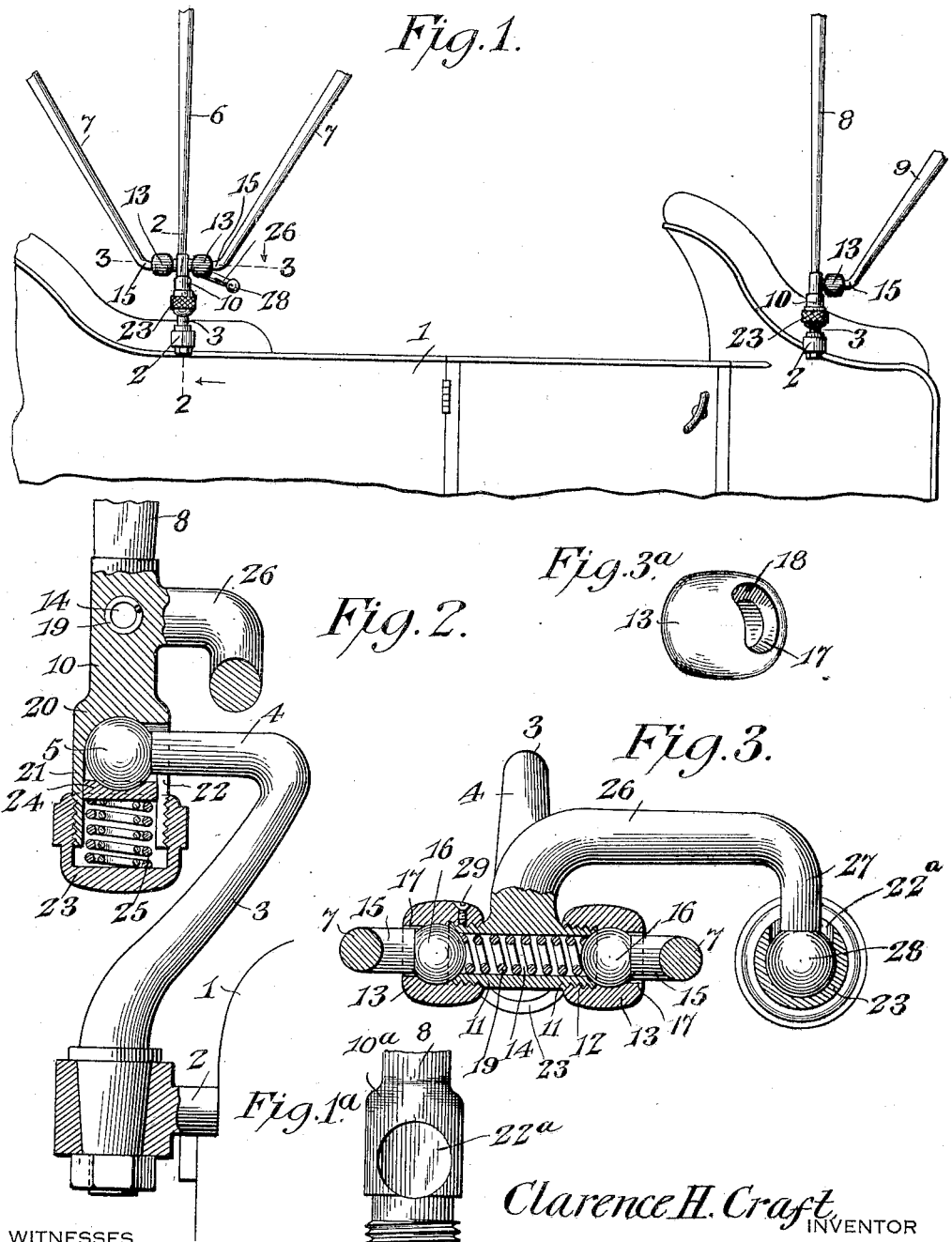

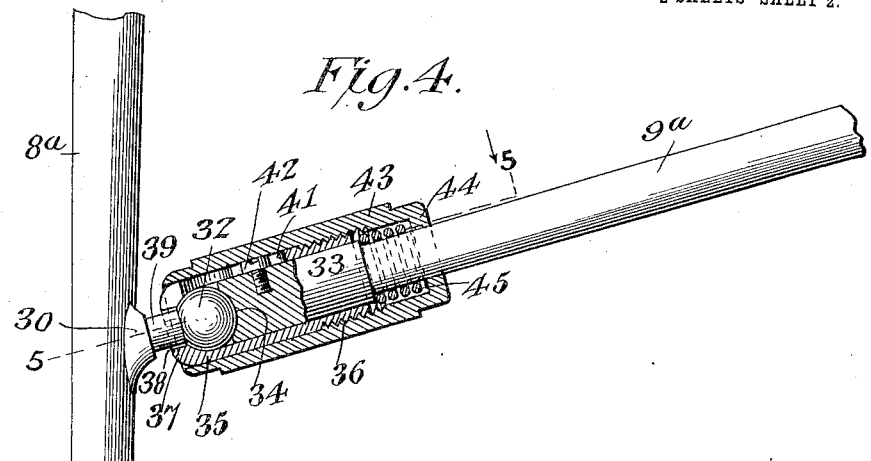
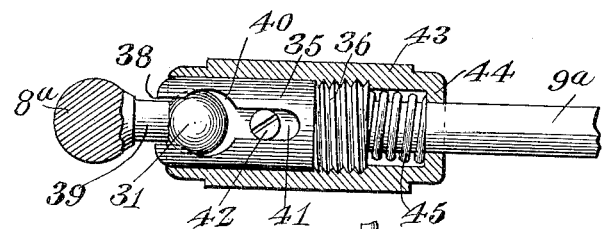
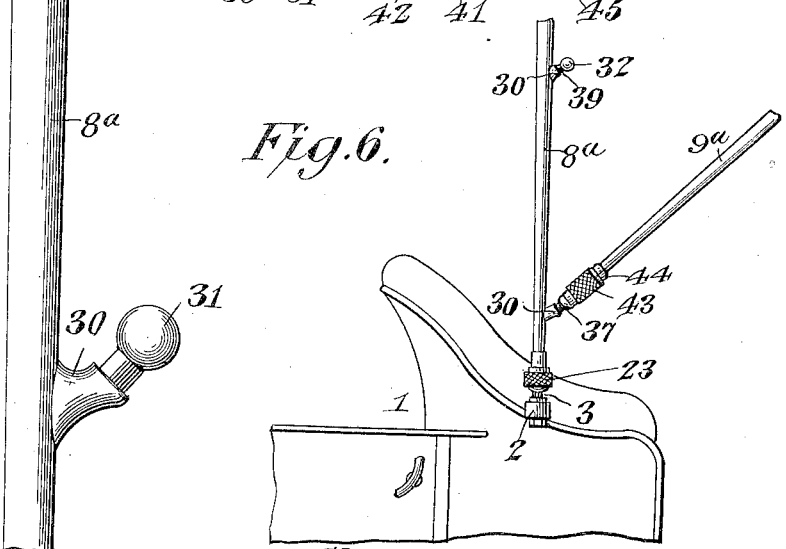

CLARENCE HORTON CRAFT, OF UNIONTOWN, PENNSYLVANIA, ASSIGNOR OF ONE-HALF TO WALLACE MILLER, OF UNIONTOWN, PENNSYLVANIA.

VEHICLE TOP-FRAME.

1,086,515.  Specification of Letters Patent.  Patented Feb. 10, 1914.

Application filed November 14, 1912. Serial No. 731,363.

*To all whom it may concern:*

Be it known that I, CLARENCE H. CRAFT, a citizen of the United States, residing at Uniontown, in the county of Fayette and State of Pennsylvania, have invented a new and useful Vehicle Top-Frame, of which the following is a specification.

This invention has reference to frames for vehicle tops and its object is to provide a means whereby loosening and rattling of the joints of vehicle tops is prevented.

The present invention is particularly adapted for use in connection with automobiles where because of the conditions to be met and the shocks and jars to which the structure is subjected the connected portions of the frame of the vehicle top become loosened by wear and produce oftentimes obtrusive noises when the automobile is traveling.

The practically universal construction employed in automobile tops provides hinge joints for the parts that fold and simple cotter pin connections for those parts which are designed to be readily removable. In accordance with the present invention all the joints which are liable to become loosened by wear or wherein provision is made for the ready separation of the parts of the joint, such joints are of a ball and socket type, and are held by locking means against liability of looseness, and in addition to such locking means elastic devices are provided for taking up all wear and holding the parts together in jar resisting relation, so that no jolts or jars to which the top is subjected will result in the production of unpleasant noises.

The invention will be best understood from a consideration of the following detailed description, taken in connection with the accompanying drawings forming a part of this specification, with the further understanding that while the drawings show practical forms of the invention, the latter is by no means limited to exact conformity with the showing of the drawings, but may be changed and modified so long as such changes and modifications mark no material departure from the salient features of the invention.

In the drawings:—Figure 1 is an elevation of a portion of an automobile body with so much of the top frame thereof as is necessary to illustrate the application of the present invention. Fig. 1ª is a detail elevation of a portion of the lower end of the frame structure designed for the front of the vehicle. Fig. 2 is a section on the line 2—2 of Fig. 1, but drawn on a larger scale. Fig. 3 is a section in part on the line 3—3 of Fig. 1 and showing other parts applied and in section, the scale of Fig. 3 being that of Fig. 2. Fig. 3ª is a detail perspective of a lock nut. Fig. 4 is an elevation with parts in section showing the adaptation of the invention to a somewhat different form of top frame construction from that shown in Fig. 1 and associated figures. Fig. 5 is a section on the line 5—5 of Fig. 4. Fig. 6 is an elevation of a portion of an automobile body showing the application of the structure of Figs. 4 and 5 and drawn to a smaller scale than said figures.

Referring to the drawings, there is shown an automobile body 1 which may be taken as typical of any suitable body, since the invention is not confined to use with any particular type of automobiles, or in fact with any particular type of vehicle other than automobiles, but since the invention is especially adapted for use in connection with automobiles, it will in the following description be considered as applied to an automobile without restriction thereto. At appropriate points from the body there are made fast brackets 2 carrying angle irons 3 constituting the fixed supporting irons for the frame of the vehicle top. Each angle member 3 terminates in an angle arm 4 ending in a ball 5, the arm 4 usually being horizontal when the vehicle is resting upon a level support and the main portion of the member 3 is usually bent toward the body of the automobile, so that the ball 5 is about over that portion of the bracket 2 carrying the member 3.

Considering first the portion of the frame of the top supported by the rear brackets or irons on the automobile body, the frame comprises a number of bows terminating in legs 6, 7, the larger types of automobile tops usually being provided at the rear portion with three bows and such a structure is provided for in the arrangement shown in Figs. 1, 2 and 3. The forward portion of the cover frame in the larger types of automobile has two bows which may be typified by the legs 8, 9, respectively, and when the top is up these legs are carried by the member 3 at the front portion of the body on each side thereof. It is customary to make one of the bows at the rear of the vehicle top in one piece with or permanently united to a forging 10, and in the case of the employment of two bows 7, this forging 10 is provided with oppositely directed alined extensions 11, though if but one bow 7 be used then only one extension 11 is provided. Considering that there are two extensions 11 each is externally screw threaded as indicated at 12 for the reception of a nut 13 and each extension 11 has formed therein an axial socket 14, the sockets of both extensions 11 when two are provided joining as a single passage through the forging.

Each bow leg 7 terminates at the free end in an angle portion 15 ending in a ball 16, while each nut 13 has a passage 17 therethrough of a size to receive the angle terminal portion of the leg 7, but too small to permit the passage of the ball 16, that portion of the nut adapted to the threaded part 12 of the extension 11 being of a size to permit the passage of the ball 16 and the interior of the nut where reduced in diameter to form the passage 17 is concaved to match the ball 16 so that the latter may move within the nut about a center interior to the nut. The passage 17 has a side extension 18 which permits movement of the corresponding leg 7 about the center of the ball to a greater extent in one direction than in other directions, since the passage 17 constrains the movement of the leg 7 substantially to an axis longitudinally of the nut 13, except in the direction defined by the extension 18 of the passage 17 when the movement of the leg in such direction may be about an axis transverse of the nut. The extension 11 is in the construction shown in Fig. 1 and associated figures substantially perpendicular to the longitudinal axis of the leg 6 or 8 as the case may be, and when the nut 13 is in place upon the extension 11 and screwed up tight the extension 18 of the passage 17 is so located that the leg 7 or 9 may be moved toward the corresponding leg 6 or 8 until substantially parallel with or even more closely approached thereto, this freedom of movement in the one direction admitting of folding of the frame in a manner to be described.

To accommodate the ball 16 the free end of the corresponding extension 11 is concaved, so that the nut 13, extension 11 and ball 16 constitute a ball and socket joint for the corresponding leg 7 or 9.

Lodged in the recess or seat 14 in the extension 11 is a spring 19 and in the case of the structure specifically shown in Fig. 3 where the passage 14 is common to both extensions 11, this spring is of sufficient length to extend through such passage and engage both balls 16 shown in Fig. 3. The purpose of the spring 19 is to take up any wear in the ball and socket joint and to hold the same with considerable frictional pressure, wherefore the joint even though it would otherwise become loose is held tight, so far as rattling is concerned, by the spring 19. This spring does not interfere at all with the folding operation, but serves to stiffen the joints and to maintain them constantly in such condition.

The forging 10 whether employed in connection with a three bowed structure, as at the left hand end of Fig. 1, or a two bowed structure, as at the right hand end thereof, is continued beyond the extensions or extension 11 on that side thereof remote from the bow 6 or 8 and this extended portion, indicated at 20, terminates in an elongated cup 21 having a longitudinally extended slot 22 opening through one wall. This extremity of the cup portion 21 is threaded for the reception of a cap nut 23. The cup 21 at its inner end is rounded for the reception of the ball 5 and lodged in the cup 21 is a follower 24 concaved on one face to match the ball 5. Carried by the cap member 23 is a spring 25, indicated in the drawing as of the double type, but which may also be of the single type, and this spring serves to maintain the follower 24 in constant engagement with the corresponding portion of the ball 5 to hold it in the concaved inner end of the cup 21. The parts are so arranged that when the ball 5 is lodged in the cup the arm 4 projects through the slot 22 and this slot permits the introduction of the ball 5 into the cup 21 through the open end of said cup.

Formed on that forging 10 which is designed to carry the rear portion of the frame of the vehicle top is an arm 26 so bent as to offstand from the forging 10 in a direction toward the body of the vehicle, and then project toward the front of the vehicle for a sufficient distance to clear the front leg 7 of the corresponding bow of the top frame, and finally this arm is bent outwardly, as indicated at 27, in a direction away from the body of the vehicle and terminates in a ball 28 adapted to be lodged in the cup 21 formed in the casting 10 carried by the end of the bow leg 8.

In Fig. 1 it is assumed that the vehicle top is open and all the nuts 13 are screwed tight, so that they may not accidentally loosen. To further prevent loosening each nut may be provided with a set screw 29, one of which is indicated in Fig. 3, so that when the nut has been screwed tight it may be locked in this position by a suitable set screw 29, thus preventing the liability of accidental loosening of the nut and its possible loss. The tension of the springs 19 and 25 will hold the balls in such frictional engagement with the nuts or other seats that while the joints will yield to a suitable force they will never become loose enough to rattle, and consequently noises due to the rattling of joints because of looseness are wholly eliminated.

The cap nut 23 applied to the rear portion of the frame may be locked with a set screw or otherwise, but that on the front portion of the frame may be knurled over beyond the threads so that it will not escape, but still may be loosened enough to permit the removal of the forging 10 from, or its application to the ball 5 or 28 as the case may be.

It is preferred to form the forging carried by the lower end of the lug 8 with an orifice $22^a$ instead of a slot 22, and this orifice is of such size that the ball 5 or the ball 28 will traverse it so that the leg 8 and parts carried thereby may be removed from the carrying member 3 at the front of the vehicle by moving the forging indicated at $10^a$ in Fig. $1^a$ in a substantially horizontal direction away from the vehicle body after the cap nut 23 has been loosened sufficiently, whereupon the front portion of the top frame is moved rearwardly until the forging $10^a$ may be applied to the arm 26 in a manner to receive the ball 28, and thence the front portion of the frame is clamped to the rear forging 10 by a suitable manipulation of the appropriate cap nut 23 and the entire frame may be folded in the manner customary in automobiles, the leg 9 folding up toward the leg 8 and the legs 7 folding toward the leg 6, while the latter turns upon the corresponding ball 5 until the entire top is laid down, as is customary.

In the foregoing description one side only of the vehicle has been considered, but it will be understood that both sides of the frame of the vehicle top are alike, and the same actions which have been described as taking place on one side of the frame take place on the other side thereof.

The arrangement already described is applicable to certain varieties of vehicle tops, but there is one more type of vehicle top where the leg of the front bow, indicated at $8^a$, in Figs. 4, 5 and 6, carries another leg $9^a$ in such manner that this leg is located higher up the leg $8^a$ when the top is extended than when the top is lowered, the bow indicated by the leg $9^a$ serving to hold the forward or canopy portion of the top in the extended position. Under these circumstances the leg $8^a$ is provided with offset members 30 each carrying a ball 31, 32, respectively, projecting from the leg $8^a$ at angles agreeable to the different angles assumed by the leg $9^a$ in its different positions. The free end of the leg $9^a$ has an enlarged cylindrical axial extension 33 concaved at the extremity, as indicated at 34. Applied to this extension is a sleeve 35 having one end externally threaded, as indicated at 36, and the other end contracted, as indicated at 37, and there provided with an axial passage 38 extended diametrically and sufficiently wide in one direction to receive a neck 39 joining the ball 31 to one offset 30 or a similar neck joining the ball 32 to the corresponding offset 30. This passage, however, is too narrow in one direction to permit the ball 31 or 32 as the case may be to escape therefrom. On one side of the sleeve near the contracted end there is formed a side passage 40 of a size to admit the introduction or withdrawal of the ball 31 or 32 as the case may be, and this opening 40 connects with the passage 38. Extending longitudinally from the opening 40 toward the threaded end 36 of the sleeve 35 is a slot or recess 41 adapted to receive the head of a screw 42 or other suitable stop device which will permit longitudinal movement of the sleeve on the extension 33, but will prevent rotative movement of the sleeve thereon.

Surrounding the sleeve 35 is an axially elongated collar 43 having one end 44 reduced to fit the main portion of the leg $9^a$ freely and yet comparatively snugly and between this reduced or closed in end of the collar 43 and the corresponding end of the enlargement 33 the leg $9^a$ is surrounded by a spring 45 of a size to engage the corresponding end of the enlarged extension 33, so that the tendency of the spring is to force the concaved end 34 of the extension 33 toward the reduced end of the sleeve 35, thereby gripping the ball 31 or 32 as the case may be with a force depending upon the extent that the collar 43 is screwed upon the sleeve 35. By this means the leg $9^a$ may be tightly and yet removably secured to the leg $8^a$ by either ball 31 or 32 to hold the forward part of the vehicle top in the extended or collapsed condition.

By the arrangements described any of the standard vehicle tops commonly in use may be made elastically tight at the joints to prevent rattling, or other obtrusive noises, while not interfering in any way with the ready raising or lowering of the vehicle top. The top is as noiseless when pulled down or collapsed as when extended.

To facilitate the manipulation of the cap nuts 23 or the collar 43 these parts may be appropriately milled on the exterior to provide gripping surfaces since it is desirable at times to loosen these parts. Such provision is not necessary with respect to the nuts 13 since these may need no adjustment and may in fact be locked in place after the initial adjustment, since they will retain their desired frictional resistance to movement through indefinitely long periods of time.

While the parts 5, 16, 28, 31 and 32 have been described as balls, it will be understood that they may be otherwise shaped so long as the requirement movements are permitted and the binding pressure may be applied with the further provision of an elastic pressure maintaining the requisite frictional grip without material interference with the desired movements or the possibility of looseness and rattling under any conditions of use.

What is claimed is:—

1. In a vehicle, a top frame having bow structures each terminating in a socket member with a nut at its free end and a follower and spring lodged in the socket member, and a bracket for each socket member having an angle extension terminating in a ball adapted to the socket member with the angle extension projecting through the side of the socket member, said bracket being attached to the vehicle body.

2. A top frame for vehicles having front and rear bow structures both terminating in socket members, respective brackets for the front and rear bow structures terminating in a ball, and the socket members each being shaped internally to receive the ball end of the bracket, and provided with clamping means for holding the ball therein, the rear bow structure having an arm thereon bent to offstand therefrom and terminating in a ball adapted to the socket member of the front bow structure and said last named socket member having a side opening of a size to permit the passage of the ball of either the front bracket or the arm on the rear bow structure.

3. In a top frame structure for vehicles, a bow having its legs each terminating in a member having a socket at the end remote from the bow and there provided with a lateral passage spaced from the socket and a bent arm terminating in a ball and also having nipples thereon at the ends of the lateral passage, other bows of the bow structure each terminating in a ball, nuts applied to the nipples and each interiorly formed to receive the ball at the end of a respective bow, a spring lodged in the lateral passage to engage the ball ends of the second named bows, a follower, spring and nut applied to each socket end of the first-named bow, and a sustaining bracket for each end of the bow structure having a ball termination adapted to the respective socket end of the bow structure to be confined therein by the follower, spring and nut.

4. In a top frame for vehicles, a rear bow having each end provided with joint connections with the vehicle and an offstanding arm adjacent to the joint connections and terminating in a ball, and a front bow and sustaining brackets therefor on the vehicle, each having a ball at its free end, the front bow terminating at each end in a socket provided with a follower, spring and cap-nut and having a side opening of a size to receive the ball on the respective front bracket and offstanding arm on the rear bow joint connection.

5. A top frame structure for automobiles comprising bows having leg portions one of which has a terminal member with oppositely arranged screw nipples projecting therefrom and a passage extending therethrough and also through the nipples, nuts adapted to the screw portions of the nipples and each having a passage therethrough with an internal enlargement, the passage at the end remote from the screw-threaded portion of the nut being elongated diametrically, the other bows of the frame terminating in balls adapted to the interior of the nuts and the terminal portions of the nipples being shaped to seat the balls, and a spring lodged in the passage through the terminal member of the first-named leg.

6. A top frame for automobiles comprising supporting members adapted to be carried by the body of the automobile and each having a ball termination, front and rear bows for the top each having a leg with a socketed terminal member adapted to receive the ball on the bracket and provided with elastic clamping means, other socket members on the terminal portions of the said bows, other bows having ball terminals adapted to said second named socket members, and elastic clamping means for the ball terminals of the last-named bow members for holding them to the first-named bow members.

7. A top frame for automobiles comprising supporting members adapted to be carried by the body of the automobile and each having a ball termination, front and rear bows for the top each having a leg with a socketed terminal member adapted to receive the ball on the bracket and provided with elastic clamping means, other socket members on the terminal portions of the said bows, other bows having ball terminals adapted to said second-named members, and elastic clamping means for the ball terminals of the last-named bow member for holding them to the first-named bow members, the rear frame members of the automobile top being provided with an arm extension terminating in a ball adapted to receive that socket member of the front frame adapted to the bracket fixed to the automobile body.

In testimony, that I claim the foregoing as my own, I have hereto affixed my signature in the presence of two witnesses.

CLARENCE HORTON CRAFT.

Witnesses:
E. S. SHOWALTER,
EWING A. HIBBS.